United States Patent Office 3,389,687
Patented June 25, 1968

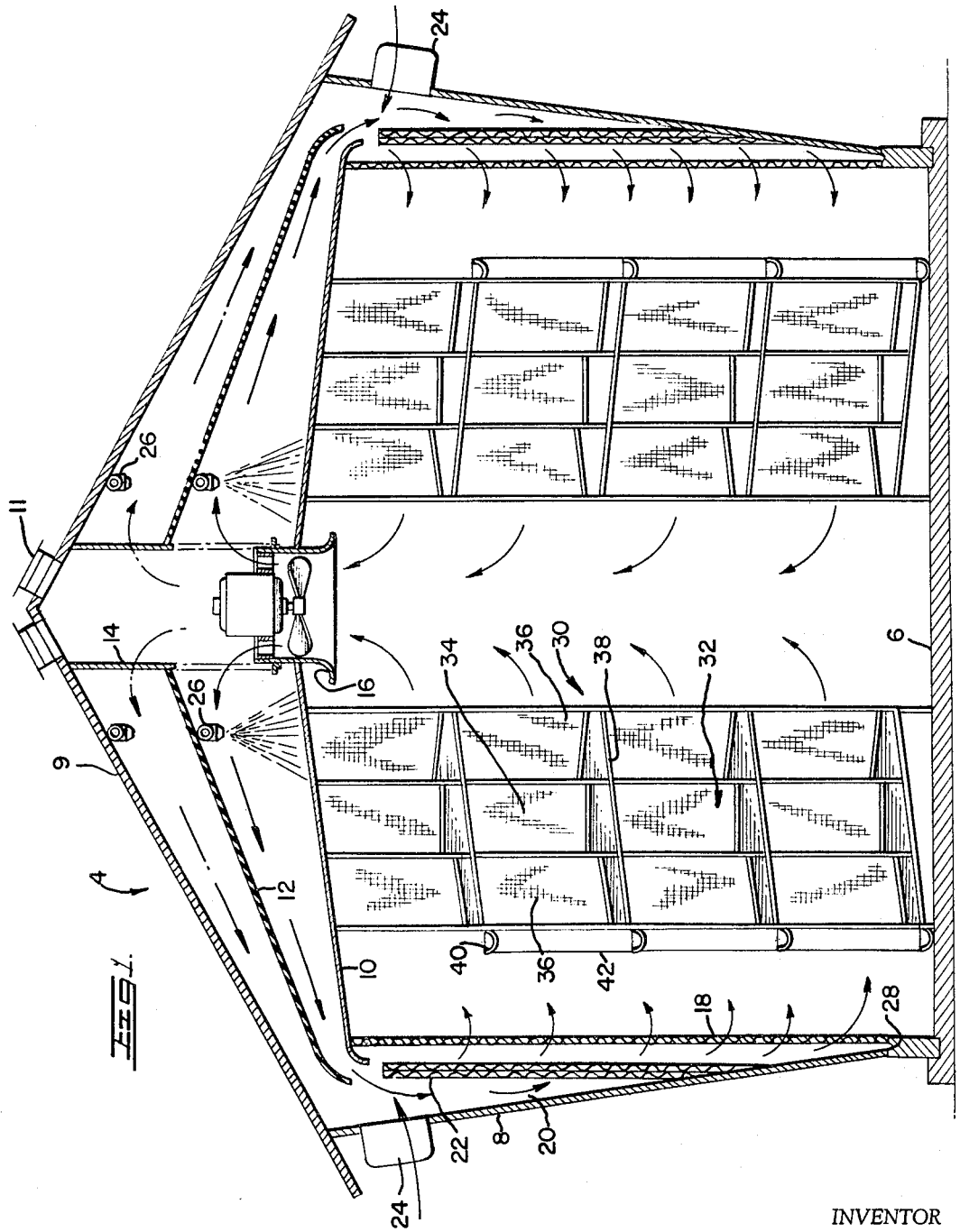

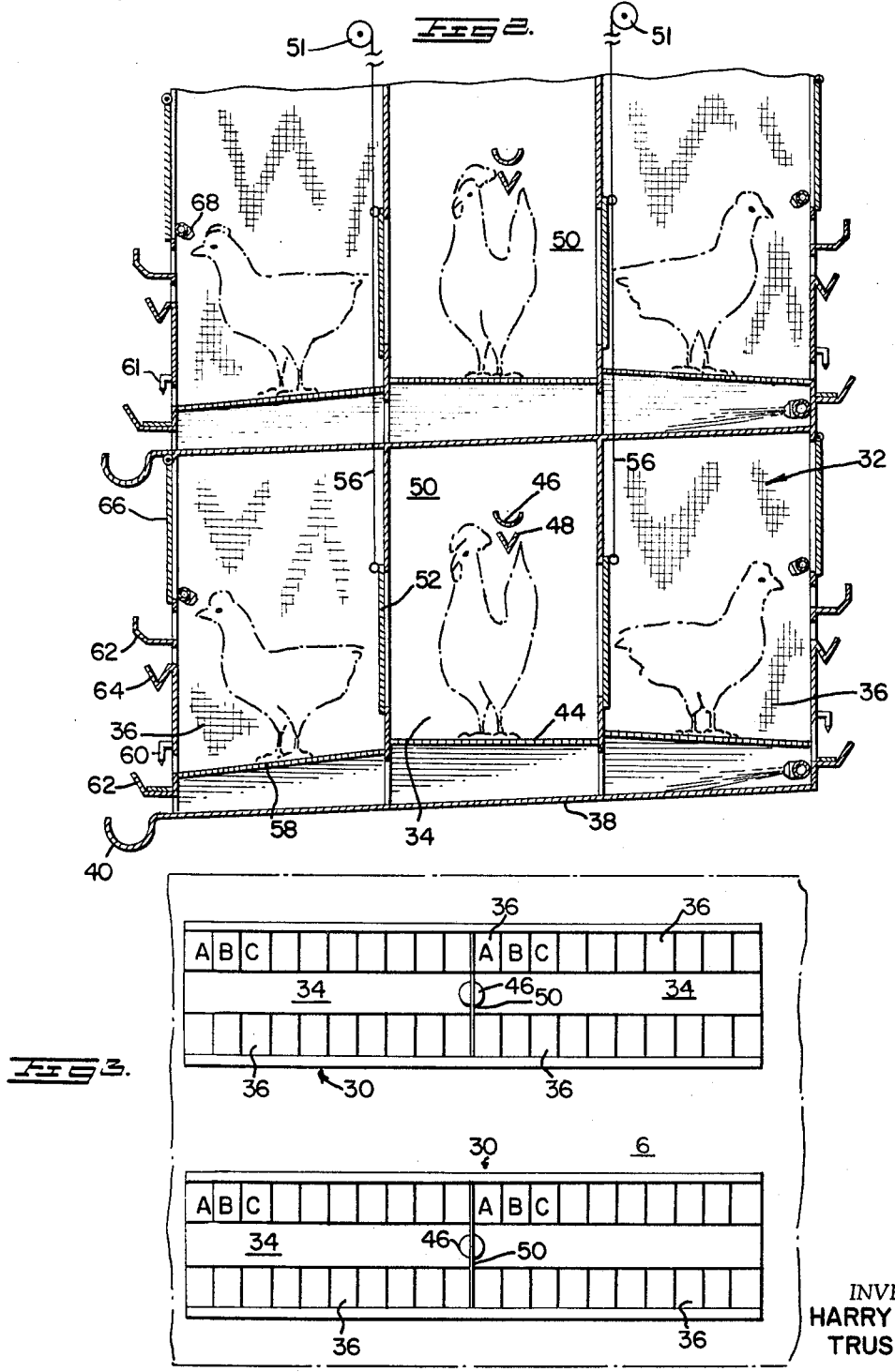

3,389,687
POULTRY BREEDING APPARATUS
Harry B. Trussell, 609 Stokeswood Ave. SE.,
Atlanta, Ga. 30316
Filed Aug. 12, 1965, Ser. No. 479,077
2 Claims. (Cl. 119—21)

ABSTRACT OF THE DISCLOSURE

A unit for controlled breeding of poultry including a rooster-containing enclosure, a plurality of hen-containing enclosures disposed adjacent the rooster-containing enclosure and normally closed access means between each of the hen-containing enclosures and the rooster-containing enclosure which are selectively opened to provide access therebetween.

---

This invention relates generally to breeding of livestock and more particularly to an apparatus for control breeding of poultry and the like.

In the present system of raising poultry in high production of fertile eggs for meat and poultry, the breeding of fowl is generally accomplished by enclosing female birds of an age ready for laying with roosters at a ratio of 8 or 10 to 1. Because of individual sex appeal characteristics among the hens and/or competition between roosters, certain hens are never fertilized or are fertilized too frequently by the roosters thereby resulting in an over-all fertility usually in the range from 80 to 90% with an average of approximately 85%. Furthermore, because of excessive activity on the part of the roosters caused by competition between roosters and other factors inherent in random breeding, there is a tendency for the male to burn out due to overexertion in a shorter period of time then would normally be the case. Random mating also prohibits identification of infertile or incompatible hens or roosters since it is impossible to record any given mating pair. Environmental conditions and present day breeding habits further induce the inception and spread of disease among the flock thereby continually reducing the liveability and layability of poultry.

It is an object of this invention to provide a method and apparatus for breeding livestock in general and poultry in particular wherein mating can be controlled by furnishing an apparatus for restricting the mating of a given set of hens to a specific rooster and by providing means to expose individual hens sequentially to the rooster.

It is another object of this invention to provide an apparatus for recording the results of mating between a specified hen and rooster by providing means to segregate the hens before, during and after mating.

It is still another object of this invention to provide an apparatus for high production control breeding by furnishing multi-group and multi-deck segregated units with means to simultaneously control access in each of the units.

It is a further object of this invention to provide a breeding apparatus having maximum efficiency, liveability and layability by furnishing means to control environmental conditions effecting these factors.

It is still another object of this invention to provide an apparatus for breeding poultry which is adapted to permit the automation of feed and water supply as well as waste removal, by furnishing mating enclosure structures for the units which are lined and arranged in superimposed decks.

It is still a further object of this invention to provide a breeding apparatus that will allow accumulation of eggs produced therefrom and yet permit ready identification of eggs produced by any given mating pair by providing positive segregation of roosters as well as segregation of individual hens exposed to each rooster so that means may be incorporated with the segregating enclosure for each hen to mark the eggs produced thereby.

These and other objects of the invention will become better understood by those skilled in the art by reference to the following detailed description when viewed in light of the accompanying drawings wherein like reference numerals throughout the figures thereof indicate like parts and wherein:

FIGURE 1 is an elevational end view of a building incorporating features in accordance with the invention showing the arrangement of breeder units and environmental control therein;

FIGURE 2 is an enlarged elevation sectional view of a portion of the breeding units of FIGURE 1, and FIGURE 3 is a reduced plan view schematically showing the arrangement of some of the breeding units in accordance with the invention.

Turning now to the FIGURE 1 of the drawings, a breeding house shown generally at 4 is made up of a floor 6, side walls 8 and a pitched roof 9. A ceiling 10 is suspended beneath the roof 9 and an insulating baffle 12 divides the space between the roof 9 and ceiling 10 for purposes to be described later. Doors 14 are disposed in an abutting relationship to the inner end of the baffle 12 and are slidable between positions covering the entrance to the chamber below the baffle 12 (as indicated by phantom lines) or the entrance to the chamber above the baffle 12. A horizontally disposed fan assembly 16 is located in the center of the ceiling 10 and serves to circulate air through the house 4. Vertically disposed porous or pervious curtains 18 depend from the ceiling 10 and serve, together with the walls 8 of the building, to form a plenum chamber 20 on either side of the building. A vertically disposed evaporative cooler 22 is located beneath the outer edge of ceiling 10 and extends downwardly to intersect the wall 8. A fresh air inlet and purification apparatus 24 is located on the wall 8 beneath the eaves formed by the roof 9. Although these devices are shown disposed on the outer surface of the wall 8, they may be located internally of the building if so desired.

In operation, the environmental control functions around the air circulating fan assemblies 16. Since the heat output of a flock of birds is always greater than that required to maintain a desired level of temperature in an enclosed house, some provision must be made for cooling the house regardless of ambient climatic conditions. Exhaust air is withdrawn from the towers 30 through the fan 16 and is then processed for recycling through the towers. If the ambient conditions are lower than those desired in the house, the doors 14 are lowered, either manually or through any automatic thermostatic control means, to block air flow through the passage beneath the baffle 12 so that air flows through the passage above the baffle. With this circulation, the roof then serves as a heat transfer surface to transmit heat from the exhaust air to the colder ambient air thereby providing a pre-cooling for air from the tower area. If, on the other hand, the ambient temperature is higher than that desired in the house, then the doors 14 are raised to position shown by solid lines in FIGURE 1, closing the passages above the baffles 12 to prevent air flow therethrough. Depending upon the position of the doors 14, the proper water spray rack 26 is activated to provide a curtain of water for both cooling and filtering the air passing therethrough. The water from the spray rack 26 then runs down the sloping ceiling 10 on the evaporative cooler 22. The evaporative coolers are formed of a series of vertically disposed pervious curtains which absorb water flowing thereon from the ceiling 10 and transmit it therethrough by capillary action. Ambient air, suitably filtered and sterilized, is admitted through the fresh air inlets 24 to be mixed with the stream of air flowing downwardly from the appropriate channel and into the plenum 20. The screen 18 is of such a character that the air flow passing therethrough undergoes a pressure drop across the screen so that a pressure head is built up within the plenum. The walls 8 are canted at such an angle to the vertical that the decrease in cross sectional area of the plenum is essentially proportional to the loss in volume of air through the screen in downwardly progressing increments occurs. This provides a constant pressure head so that the velocity and volume of air flow into the tower area is substantially constant throughout the vertical length of the screen 18. Means are also provided to filter the air passing through the evaporative cooler 22 to remove any traces of feather dust or other disease-carrying matter from the flow. In this manner, the air entering the tower area is completely cleaned and reconditioned prior to passage through the towers 30. By proper regulation of the amount of spray, the velocity of the air, and the amount of fresh air into the circulating system, the temperature, humidity, velocity and cleanliness of the air can be regulated to a high degree and by cleaning the air, the transmission of disease through airborne feather dust, dirt and other materials is eliminated.

By automatic or manually controlled flushing of the sloping surface 38, the bird droppings are enrobed and removed at any desired interval so that diseases resulting from accumulation and putrification of droppings as well as the odors caused thereby are kept at a minimum. Through the combination of the recycling and cleaning of the air and the constant removal of the droppings, most of the disease-spreading and/or causing factors are minimized while comfort conditions are maintained at as high a level as possible.

Referring now to the operation of towers 30, hens of an egg-laying age are placed in each of the hen enclosures 36 while a single rooster is placed in the rooster enclosure 34. It has been determined that, if properly fertilized, a hen will lay fertile eggs for a period of in excess of a week. It has also been determined that a hen exposed to a rooster without the distraction of other hens or competition from other roosters will be covered on the average of three times in one-hour period. With this as background the towers operate as follows: through the use of an automatic apparatus suitable for the purpose such as a driven pully 51 the access doors 52 in the first series of cages in each tower (for example, cage A in FIGURE 3) are opened thereby providing an access between that cage and the rooster enclosure 34 for each tower. The jet 68 is turned on in the hen enclosures for which the doors 52 have been opened thereby inducing the hens in these enclosures to move into the rooster enclosure 34 whereupon the doors 52 are closed to prevent the hens from returning thereto. After a sufficient time to provide proper covering for the hen by the rooster, preferably on the order of one hour, the access doors 52 for the hen enclosures 36 from which the hen currently confined in the rooster enclosure 34 emerged, are opened. Because the hen's feed and water are available in her cage, the rooster's feed and water being preferably disposed too high for the hen to reach, and for various other psychological reasons, the hen will rather quickly return to her enclosure upon which time the door 52 to the enclosure is reclosed. The closure of the door 52 after egress and return of the hen is preferably controlled by means which sense the presence or absence of the hen in each enclosure 36. After a determined period of time, sufficient to give the rooster time to recuperate, the doors 52 of the next succeeding hen enclosure 56 are raised and the jets 68 at the end of the enclosure are activated to induce the hen therein to move into the rooster enclosure 34. The process is then sequentially repeated as above until all of the enclosures have been activated.

With the above procedure, sufficient time is provided for a rooster to properly settle over twenty hens in less than a week so that 100 percent of the hens will be perpetually fertilized in the breeding unit.

As the hens lay their eggs, they are deposited on the sloping floor 58 of the enclosure 36 and roll down through the opening 60 to be marked or coded by the marker 61 and transported on a conveyer 62 to a centralized collecting point. In this manner, each egg is identifiable with the hen from which it came and with the rooster by which it should have been fertilized. If sterility problems occur, unfertilized eggs can quickly be traced to their source and steps taken to correct or eliminate this source of sterile eggs. If for example, all of the eggs from one unit are unfertilized, then the rooster is obviously sterile and must be replaced. Often, however, a rooster-hen pair will be genetically incompatible and, if this may be the case, the hen may be switched to another unit to determine if a different rooster will correct the problem.

In a general manner while there has been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:

1. A unit for controlled breeding of poultry comprising:
   a rooster containing enclosure having a perforate floor thereto;
   a plurality of hen containing enclosures disposed adjacent said rooster containing enclosure, a perforate floor in each of said hen containing enclosures sloping away from said rooster containing enclosure, a conveyer means disposed adjacent the lower edge of the floor in said hen containing enclosures and an opening in said hen containing enclosure proximate said conveyer to permit passage of eggs dropped from the floor in said hen containing enclosures to said conveyer;
   a sloping surface disposed subjacent said enclosures and extending coextensive therewith, means to periodically sweep said surface with liquid, and means to collect the effluent from said surface;
   normally closed access means between each of said hen containing enclosures and said rooster containing enclosure;
   and means to selectively open each of said access means.

2. An apparatus for high production controlled breeding of poultry comprising building having a floor, walls and ceiling thereto;
   a plurality of poultry breeding towers arranged in said building, said towers including a plurality of stacked superimposed poultry breeding units, each of said units comprising a rooster containing enclosure having a perforate floor thereto, a plurality of hen containing enclosures disposed adjacent said rooster containing enclosure, a perforate floor in each of said hen containing enclosures sloping away from said rooster containing enclosure, an egg receiving and conveying means disposed on the lower edge of the floor in said hen containing enclosures, an opening disposed in the wall of said hen enclosure to transmit eggs dropped on the floor of said hen enclosure to said conveyer, a sloping surface disposed subjacent said enclosure and extending coextensive therewith, means to periodically sweep said surface with liquid, and means to collect the effluent from said surface, normally closed access means between each of said hen containing enclosures and said rooster containing enclosure;

means to simultaneously actuate the access means for each of the hen enclosures which are disposed in vertical aligned relationship to one another to transfer the hens in those enclosures between that enclosure and said rooster containing enclosure and vise versa, and means including a fan and duct system for transversely circulating purified and cooled air evenly through said towers.

References Cited

UNITED STATES PATENTS

| | | | |
|---|---|---|---|
| 2,061,712 | 11/1936 | Martin | 119—31 |
| 2,701,547 | 2/1955 | Shaw | 119—22 |
| 2,702,503 | 2/1955 | Wildhaber | 98—33 |
| 3,244,147 | 4/1966 | Kogeichi et al. | 119—18 |
| 3,254,627 | 6/1966 | Cross | 119—17 |

HUGH R. CHAMBLEE, *Primary Examiner.*